(12) United States Patent
Salter et al.

(10) Patent No.: US 9,764,686 B2
(45) Date of Patent: Sep. 19, 2017

(54) LIGHT-PRODUCING ASSEMBLY FOR A VEHICLE

(71) Applicant: Ford Global Technologies, LLC, Dearborn, MI (US)

(72) Inventors: Stuart C. Salter, White Lake, MI (US); Matthew Majkowski, Dearborn, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 14/694,557

(22) Filed: Apr. 23, 2015

(65) Prior Publication Data

US 2015/0226390 A1 Aug. 13, 2015

Related U.S. Application Data

(63) Continuation-in-part of application No. 14/603,636, filed on Jan. 23, 2015, now Pat. No. 9,573,517, which is a continuation-in-part of application No. 14/086,442, filed on Nov. 21, 2013.

(51) Int. Cl.
| | |
|---|---|
| *B60Q 3/68* | (2017.01) |
| *H05B 37/02* | (2006.01) |
| *B60Q 3/80* | (2017.01) |
| *B60Q 3/20* | (2017.01) |

(52) U.S. Cl.
CPC ............... *B60Q 3/68* (2017.02); *B60Q 3/80* (2017.02); *H05B 37/0218* (2013.01); *H05B 37/0227* (2013.01); *B60Q 3/20* (2017.02); *Y02B 20/46* (2013.01)

(58) Field of Classification Search
CPC .... B60Q 3/008; B60Q 3/0293; B60Q 3/0209; B60Q 2400/10; H05B 37/0218; H05B 37/0227; H05B 33/00; Y02B 20/46; F21V 9/00; F21V 9/16; C09K 11/00; F21S 48/1136; F21K 2/00
See application file for complete search history.

(56) References Cited

U.S. PATENT DOCUMENTS

| | | |
|---|---|---|
| 5,053,930 A | 10/1991 | Benavides |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,419,854 B1 | 7/2002 | Yocom et al. |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Bao Q Truong
(74) *Attorney, Agent, or Firm* — Vichit Chea; Price Heneveld LLP

(57) ABSTRACT

A light-producing assembly for a vehicle is provided herein. The light-producing assembly includes a plurality of light and a photoluminescent structure. The photoluminescent structure includes a plurality of photoluminescent material arranged to alternate with each other. The plurality of photoluminescent materials are each configured to luminesce in a distinct color in response to excitation by a corresponding portion of the plurality of light sources.

18 Claims, 8 Drawing Sheets

(56) References Cited

U.S. PATENT DOCUMENTS

| | | |
|---|---|---|
| 6,494,490 B1 | 12/2002 | Trantoul |
| 6,577,073 B2 | 6/2003 | Shimizu et al. |
| 6,700,322 B1 | 3/2004 | Duggal et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,223,988 B2 | 5/2007 | Lowe et al. |
| 7,264,366 B2 | 9/2007 | Hulse |
| 7,264,367 B2 | 9/2007 | Hulse |
| 7,393,618 B2 | 7/2008 | Ioku et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,625,501 B2 | 12/2009 | Yang et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,915,627 B2 * | 3/2011 | Li .................... G02B 6/005 257/98 |
| 7,960,688 B2 | 6/2011 | Agrawal et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,845,380 B2 * | 9/2014 | Harbers .................... F21V 9/16 313/483 |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0153311 A1 | 6/2012 | Yuan et al. |
| 2012/0183677 A1 | 7/2012 | Agrawal et al. |
| 2012/0280528 A1 | 11/2012 | Dellock et al. |
| 2013/0092965 A1 * | 4/2013 | Kijima .................... F21V 3/04 257/98 |
| 2013/0094178 A1 | 4/2013 | Huang et al. |
| 2013/0320834 A1 | 12/2013 | Ulasyuk |
| 2013/0335994 A1 | 12/2013 | Mulder et al. |
| 2014/0022761 A1 | 1/2014 | Wei et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0160728 A1 * | 6/2014 | Kim .................... H01L 25/0753 362/84 |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014151263 A1 | 9/2014 |

* cited by examiner

LIGHT-PRODUCING ASSEMBLY FOR A VEHICLE

CROSS-REFERENCE TO THE RELATED APPLICATIONS

This application is a continuation-in-part of U.S. patent application Ser. No. 14/603,636, filed Jan. 23, 2015, entitled "DOOR ILLUMINATION AND WARNING SYSTEM," now U.S. Pat. No. 9,573,517, which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems and more particularly relates to vehicle lighting systems employing photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a light-producing assembly for a vehicle is provided. The light-producing assembly includes a plurality of light and a photoluminescent structure. The photoluminescent structure includes a plurality of photoluminescent material arranged to alternate with each other. The plurality of photoluminescent materials are each configured to luminesce in a distinct color in response to excitation by a corresponding portion of the plurality of light sources.

According to another aspect of the present invention, a light-producing assembly for a vehicle is provided. The light-producing assembly includes a plurality of light sources and a photoluminescent structure. The photoluminescent structure is arranged over the plurality of light sources and includes a plurality of photoluminescent materials arranged to alternate in a tessellation. Each of the plurality of photoluminescent materials is configured to luminesce in a distinct color in response to excitation by a corresponding portion of the plurality of light sources.

According to yet another aspect of the present invention, a photoluminescent structure of a light-producing assembly for a vehicle is provided. The photoluminescent structure includes an energy conversion layer having a plurality of photoluminescent materials arranged to alternate in a tessellation. Each of the plurality of photoluminescent materials is configured to luminesce in a distinct color in response to excitation by a corresponding portion of the plurality of light sources.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a light-producing assembly for vehicle use. The light-producing assembly may be received by a variety of vehicle fixtures or equipment found on the exterior or interior of a vehicle and may function to provide ambient lighting, task lighting, the like, or a combination thereof. While the following disclosure is directed to automobile lighting applications, it should be appreciated that the teachings provided herein may be similarly applied to lighting applications of other types of vehicles designed to transport one or more passengers such as, but not limited to, aircraft, watercraft, trains, and all-terrain vehicles (ATVs).

Figure 1:
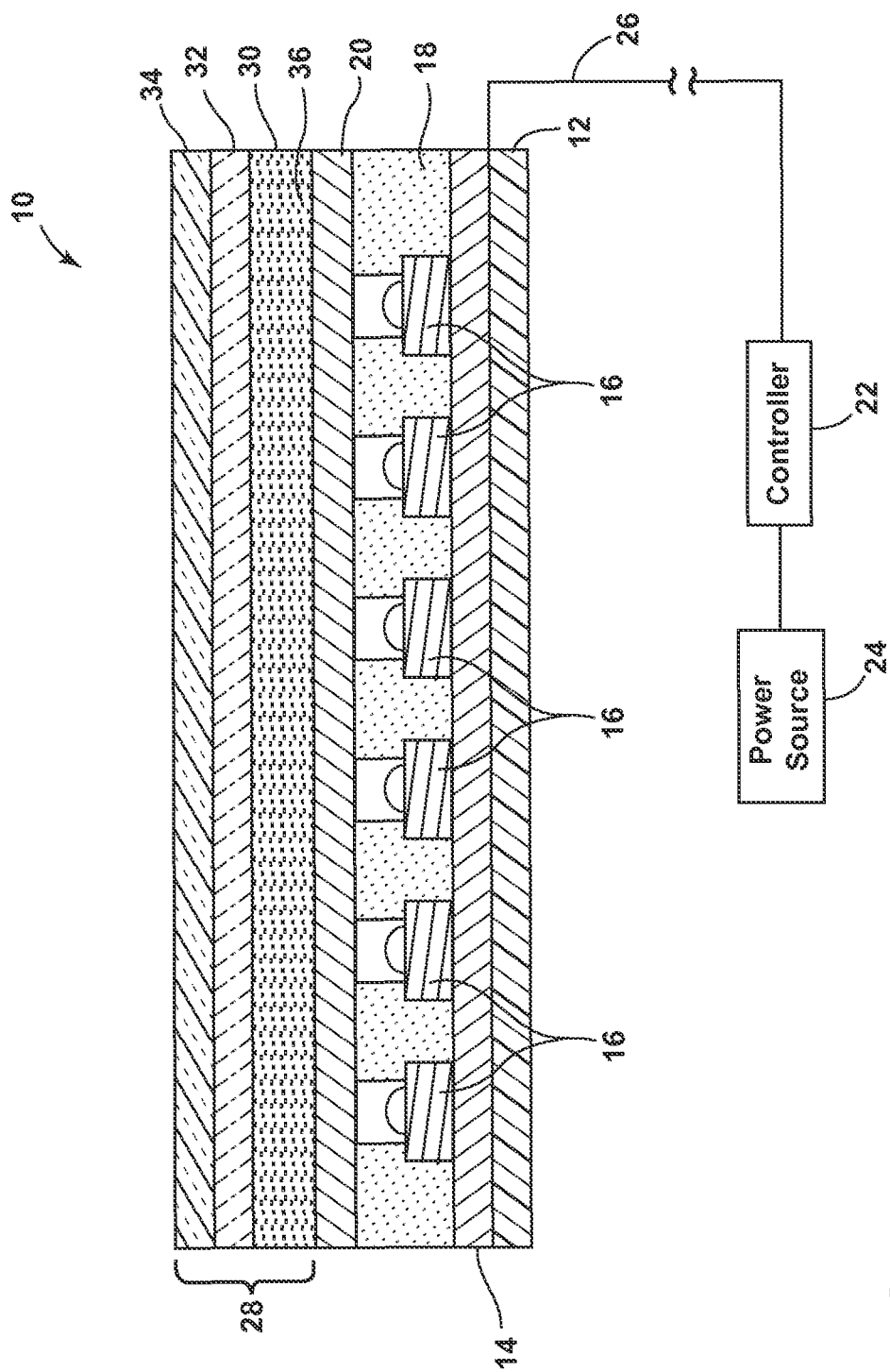
FIG. 1 is a cross-sectional view of a light-producing assembly according to one embodiment.

Referring to FIG. 1, a cross-sectional view of a light-producing assembly 10 is shown according to one embodiment. The light-producing assembly 10 includes a substrate 12, which may be directly arranged over an intended vehicle fixture or equipment on which the light-producing assembly 10 is to be received. Alternatively, the substrate 12 may correspond to a surface of a vehicle fixture or equipment. The substrate 12 may include a polycarbonate, poly-methyl methacrylate (PMMA), or polyethylene terephthalate (PET) material on the order of 0.005 to 0.060 inches thick. A positive electrode 14 is arranged over the substrate 12 and includes a conductive epoxy such as, but not limited to, a silver-containing or copper-containing epoxy. The positive electrode 14 is electrically connected to at least a portion of a plurality of LED sources 16 arranged within a semiconductor ink 18 and applied over the positive electrode 14. Likewise, a negative electrode 20 is also electrically connected to at least a portion of the LED sources 16. The negative electrode 20 is arranged over the semiconductor ink 18 and includes a transparent or translucent conductive material such as, but not limited to, indium tin oxide. Additionally, each of the positive and negative electrodes 14, 20 are electrically connected to a controller 22 and a power source 24 via one or more wirings 26. The controller 22 may be variously located in the vehicle and the power source 24 may correspond to a vehicular power source operating at 12 to 16 VDC. The one or more wirings 26 may be secured within the housing of the fixture or equipment on which the light-producing assembly 10 is to be received. If located on the exterior of the vehicle, the one or more wirings 26 may be wired through the frame of the vehicle.

The LED sources 16 may be dispersed in a random or controlled fashion within the semiconductor ink 18 and may be configured to emit focused or non-focused light. The LED sources 16 may correspond to micro-LEDs of gallium nitride elements on the order of 5 to 400 microns in size and the semiconductor ink 18 may include various binders and dielectric material including, but not limited to, one or more of gallium, indium, silicon carbide, phosphorous, and/or translucent polymeric binders. In this manner, the semiconductor ink 18 may contain various concentrations of LED sources 16 such that the density of the LED sources 16 may be adjusted for various lighting applications. In some embodiments, the LED sources 16 and semiconductor ink 18 may be sourced from Nth Degree Technologies Worldwide Inc. The semiconductor ink 18 can be applied through various printing processes, including ink jet and silk screen processes to selected portion(s) of the positive electrode 14. More specifically, it is envisioned that the LED sources 16 are dispersed within the semiconductor ink 18, and shaped and sized such that a substantial quantity of them align with the positive and negative electrodes 14, 20 during deposition of the semiconductor ink 18. The portion of the LED sources 16 that ultimately are electrically connected to the positive and negative electrodes 14, 20 may be illuminated by a combination of the controller 22, power source 24, and the one or more wirings 26. Additional information regarding the construction of light-producing assemblies is disclosed in U.S. Patent Publication No. 2014-0264396 A1 to Lowenthal et al., entitled "ULTRA-THIN PRINTED LED LAYER REMOVED FROM SUBSTRATE," now U.S. Pat. No. 9,299,887, filed Mar. 12, 2014, the entire disclosure of which is incorporated herein by reference.

Referring still to FIG. 1, the light-producing assembly 10 further includes at least one photoluminescent structure 28 arranged over the negative electrode 20 as a coating, layer, film or other suitable deposition. With respect to the presently illustrated embodiment, the photoluminescent structure 28 may be arranged as a multi-layered structure including an energy conversion layer 30, a stability layer 32, and a protection layer 34. The energy conversion layer 30 includes at least one photoluminescent material 36 having energy converting elements with phosphorescent or fluorescent properties. For example, the photoluminescent material 36 may include organic or inorganic fluorescent dyes including rylenes, xanthenes, porphyrins, phthalocyanines. Additionally or alternatively, the photoluminescent material 36 may include phosphors from the group of Ce-doped garnets such as YAG:Ce. The energy conversion layer 30 may be prepared by dispersing the photoluminescent material 36 in a polymer matrix to form a homogenous mixture using a variety of methods. Such methods may include preparing the energy conversion layer 30 from a formulation in a liquid carrier medium and coating the energy conversion layer 30 to the negative electrode 20 or other desired substrate. The energy conversion layer 30 may be applied to the negative electrode 20 by painting, screen printing, flexography, spraying, slot coating, dip coating, roller coating, and bar coating. Alternatively, the energy conversion layer 30 may be prepared by methods that do not use a liquid carrier medium. For example, the energy conversion layer 30 may be rendered by dispersing the photoluminescent material 36 into a solid state solution (homogenous mixture in a dry state) that may be incorporated in a polymer matrix formed by extrusion, injection, compression, calendaring, thermoforming, etc.

To protect the photoluminescent material 36 contained within the energy conversion layer 30 from photolytic and thermal degradation, the photoluminescent structure 28 may optionally include stability layer 32. The stability layer 32 may be configured as a separate layer optically coupled and adhered to the energy conversion layer 30 or otherwise integrated therewith. The photoluminescent structure 28 may also optionally include protection layer 34 optically coupled and adhered to the stability layer 32 or other layer to protect the photoluminescent structure 28 from physical and chemical damage arising from environmental exposure. The stability layer 32 and/or the protection layer 34 may be combined with the energy conversion layer 30 through sequential coating or printing of each layer, sequential lamination or embossing, or any other suitable means. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

In operation, the photoluminescent material 36 is formulated to become excited upon receiving inputted light of a specific wavelength from at least a portion of the LED sources 16 of the light-producing assembly 10. As a result, the inputted light undergoes an energy conversion process and is re-emitted at a different wavelength. According to one embodiment, the photoluminescent material 36 may be formulated to convert inputted light into a longer wavelength light, otherwise known as down conversion. Alternatively, the photoluminescent material 36 may be formulated to convert inputted light into a shorter wavelength light, otherwise known as up conversion. Under either approach, light converted by the photoluminescent material 36 may be immediately outputted from the photoluminescent structure 28 or otherwise used in an energy cascade, wherein the converted light serves as inputted light to excite another formulation of photoluminescent material located within the energy conversion layer 30, whereby the subsequent converted light may then be outputted from the photoluminescent structure 28 or used as inputted light, and so on. With respect to the energy conversion processes described herein, the difference in wavelength between the inputted light and the converted light is known as the Stokes shift and serves as the principle driving mechanism for an energy conversion process corresponding to a change in wavelength of light.

Figure 2:
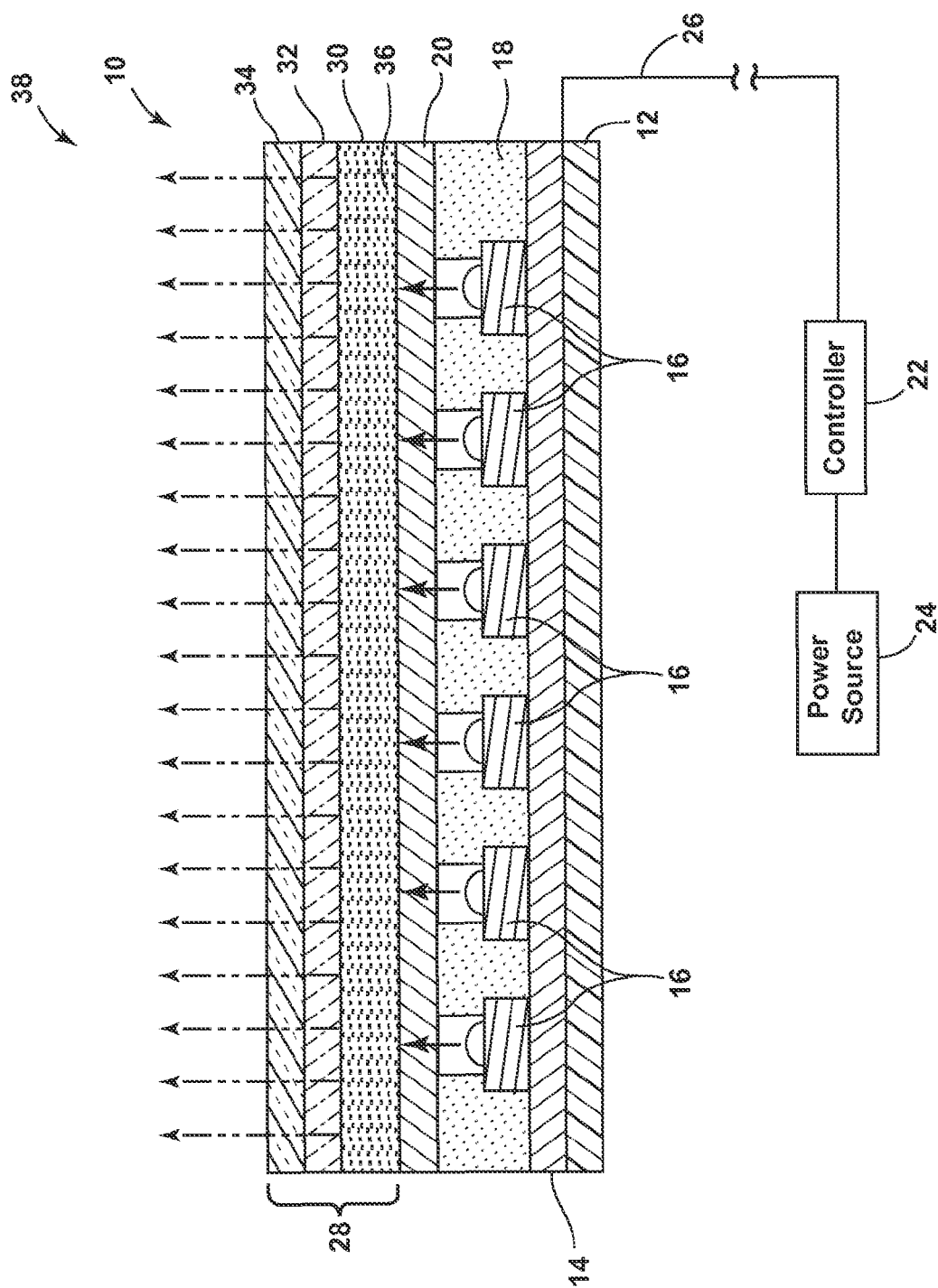
FIG. 2 illustrates an energy conversion process for generating a single color, according to one embodiment.

Referring to FIG. 2, an energy conversion process 38 for generating a single color of light is illustrated according to one embodiment. For purposes of illustration, the energy conversion process 38 is described below with continued reference to the light-producing assembly 10 depicted in FIG. 1. In the present embodiment, the energy conversion layer 30 of the photoluminescent structure 28 includes only photoluminescent material 36, which is formulated to have an absorption spectrum that includes the emission wavelength of an inputted light (e.g., solid arrows) supplied from at least a portion of the LED sources 16. The inputted light undergoes an energy conversion and is outputted as converted light (e.g., broken arrows) from the photoluminescent structure 28. The photoluminescent material 36 is also formulated to have a Stokes shift resulting in the converted light having an emission spectrum expressed in a desired color, which may vary depending on the lighting application. In one embodiment, the energy conversion process 38 is undertaken by way of down conversion, whereby the inputted light includes light on the lower end of the visibility spectrum such as blue, violet, or ultraviolet (UV) light. Doing so enables blue, violet, or UV LEDs to be used as the LED sources 16, which may offer a relative cost advantage over simply using LEDs of the desired color and foregoing the energy conversion process 38 altogether. Furthermore, the resulting luminescence of the light-producing assembly 10 offers a unique and attractive viewing experience that may be difficult to duplicate through non-photoluminescent means.

In operation, the controller 22 may control the light emission intensity of the LED sources 16 to ultimately affect the brightness in which the photoluminescent structure 28 luminesces. For example, the controller 22 may control the intensity of the LED sources 16 through pulse-width modulation or direct current control. Additionally or alternatively, the controller 22 may control the light emission duration of the LED sources 16 to affect the duration in which the photoluminescent structure 28 luminesces. For example, the controller 22 may activate all or a portion of the LED sources 16 for an extended duration such that at least a portion of the photoluminescent structure 28 exhibits sustained luminescence. Alternatively, the controller 22 may flash all or a portion of the LED sources 16 at varying time intervals such that the photoluminescent structure 28 exhibits a blinking effect. In some embodiments, the controller 22 may activate certain portions of the LED sources 16 at different times to illuminate select portions of the photoluminescent structure 28. For example, the LED sources 16 may be operated to excite the photoluminescent structure 28 to luminesce from one side to the other, from top to bottom, bottom to top, and the like. It should be appreciated that numerous activation schemes are possible by manipulating the intensity and/or duration of all or a portion of the LED sources 16 of the light-producing assembly 10.

Figure 3:
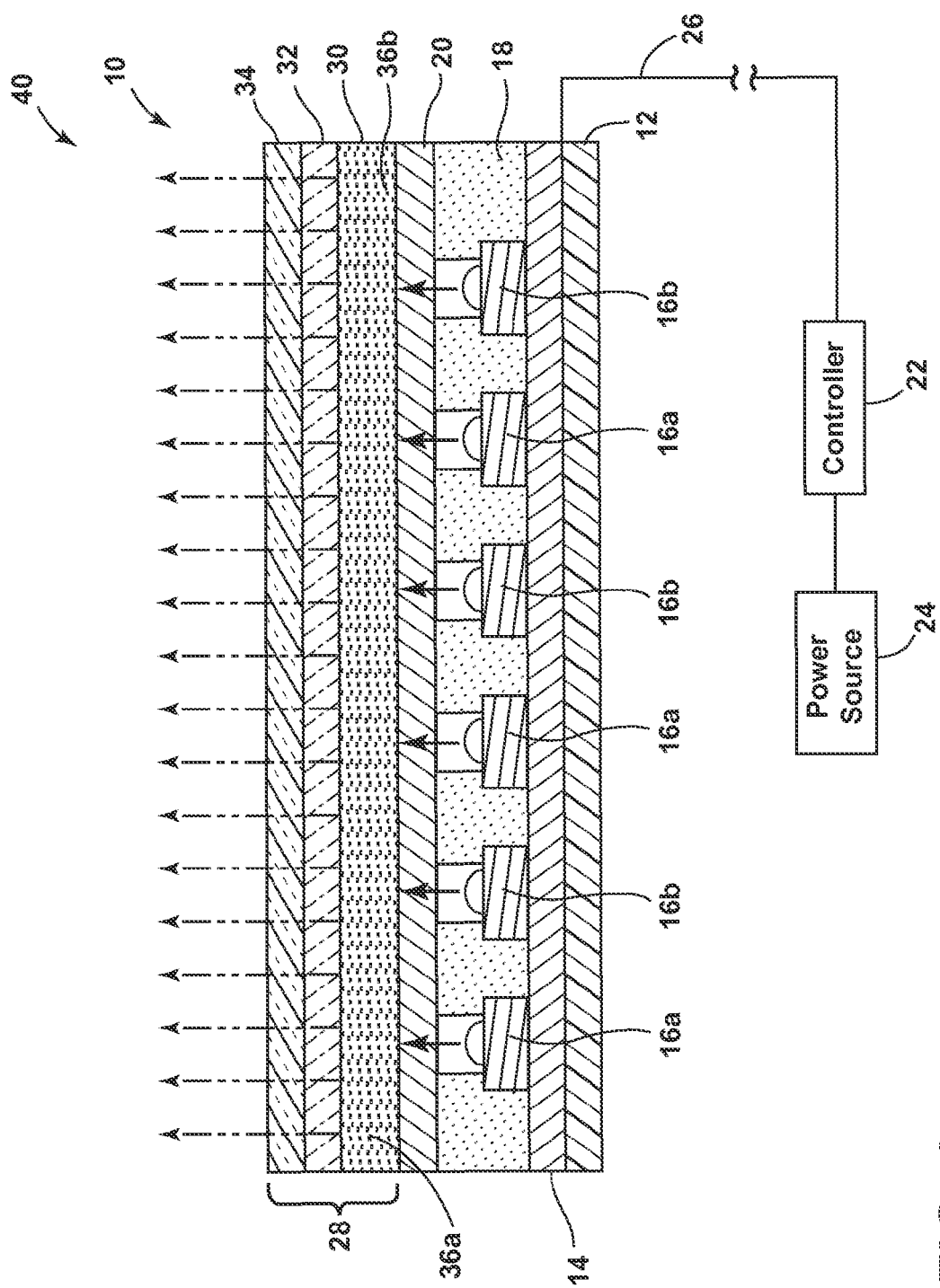
FIG. 3 illustrates an energy conversion process for generating one or more colors, according to one embodiment.
Figure 4:
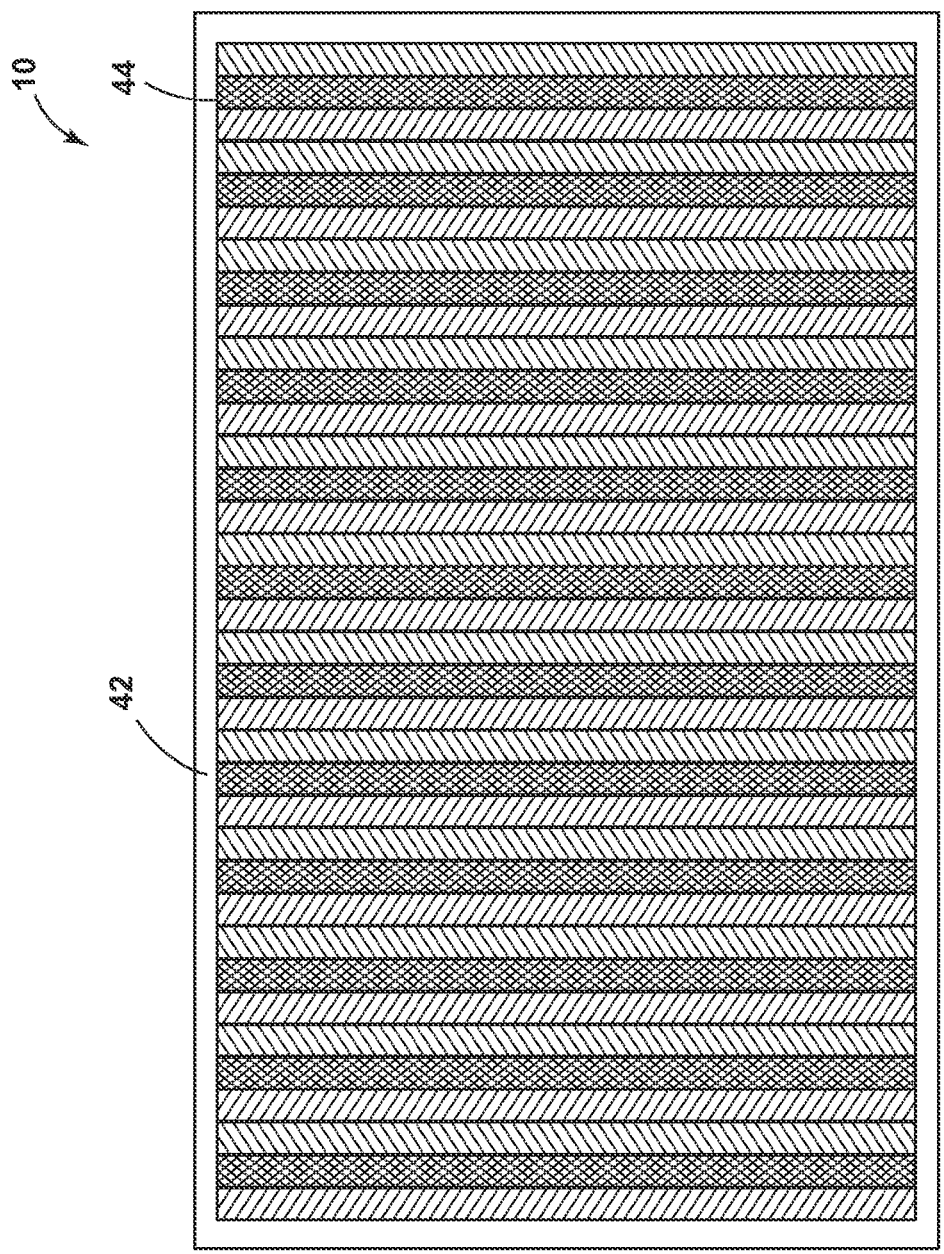
FIGS. 4-7 illustrate various embodiments of a plurality of photoluminescent materials arranged in a tessellation.
Figure 4:
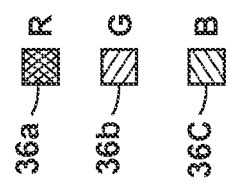

Referring to FIG. 3, an energy conversion process 40 for generating one or more colors of light is illustrated according to one embodiment. For consistency, the energy conversion process 70 is also described below with continued reference to the light-producing assembly 10 depicted in FIG. 1. In the present embodiment, the energy conversion layer 30 includes two distinct photoluminescent materials 36a, 36b that are interspersed within the energy conversion layer 30. Alternatively, the photoluminescent materials 36a, 36b may be isolated from each other if desired. Also, it should be appreciated that the energy conversion layer 30 may include more than two distinct photoluminescent materials, in which case, the teachings provided below similarly apply. In one embodiment, energy conversion process 40 occurs by way of down conversion using blue, violet, and/or UV light as the source of excitation.

With respect to the presently illustrated embodiment, the excitation of photoluminescent materials 36a and 36b are mutually exclusive. That is, photoluminescent materials 36a and 36b are formulated to have non-overlapping absorption spectrums and Stoke shifts that yield different emission spectrums. Also, in formulating the photoluminescent materials 36a, 36b, care should be taken in choosing the associated Stoke shifts such that the converted light emitted from one of the photoluminescent materials 36a, 36b does not excite the other, unless so desired. According to one exemplary embodiment, a first portion of the LED sources 16, exemplarily shown as LED sources 16a, is configured to emit an inputted light having an emission wavelength that only excites photoluminescent material 36a and results in the inputted light being converted into a visible light of a first color that is outputted from the photoluminescent structure 28. Likewise, a second portion of the LED sources 16, exemplarily shown as LED sources 16b, is configured to emit an inputted light having an emission wavelength that only excites photoluminescent material 36b and results in the inputted light being converted into a visible light of a second color that is also outputted from the photoluminescent structure 28. Preferably, the first and second colors are visually distinguishable from one another.

In operation, LED sources 16a and 16b may be controlled in any manner described previously with reference to LED sources 16 in FIG. 2. Additionally, LED sources 16a and 16b may be selectively activated using the controller 22 to cause the photoluminescent structure 28 to luminesce in a variety of colors. For example, the controller 22 may activate only LED sources 16a to exclusively excite photoluminescent material 36a, resulting in the photoluminescent structure 28 luminescing only in the first color. Alternatively, the controller 22 may activate only LED sources 16b to exclusively excite photoluminescent material 36b, resulting in the photoluminescent structure 28 luminescing only in the second color. Alternatively still, the controller 22 may activate LED sources 16a and 16b in concert, which causes both of the photoluminescent materials 36a, 36b to become excited, resulting in the photoluminescent structure 28 luminescing in a third color, which is a color mixture of the first and second color. For energy conversion layers containing more than two distinct photoluminescent materials, a greater diversity of colors may be achieved. Contemplated colors include red, green, blue, and combinations thereof including white, all of which may be achieved by selecting the appropriate combinations of photoluminescent materials and LED sources.

Referring to FIGS. 4-7, a top-down view of the light-producing assembly 10 depicted in FIG. 1 is generally shown illustrating various arrangements of a plurality of photoluminescent materials, exemplarily shown as photoluminescent materials 36a, 36b, and 36c. With respect to each embodiment, the photoluminescent materials 36a-36c are arranged to alternate with each other and are each configured to luminesce in a distinct color in response to excitation by a corresponding portion of the plurality of light sources. For example, photoluminescent materials 36a, 36b, and 36c may correspond to red-emitting photoluminescent materials, green-emitting photoluminescent materials, and blue-emitting photoluminescent materials, respectively. If desired, portions 41 of the photoluminescent structure 28 may be made to block light to define a particular shape, pattern, or other graphic. For example, an opaque ink may be applied over top portion 42 via silk screen, ink jet, or other printing processes. Similarly, a translucent ink may be applied over the remaining top portion of the photoluminescent structure 28.

Referring still to FIGS. 4-7, the photoluminescent materials 36a-36c may be arranged in a tessellation that includes a single repeated shape without gaps and/or overlap. In alternative embodiments, the tessellation may include different shapes if desired. Tessellation offers improved light uniformity when the photoluminescent materials 36a-36c are excited individually or in any combination. In such an arrangement, the need for a light diffusing element may be alleviated, thereby reducing cost. In some embodiments, each one of the photoluminescent materials 36a-36c may be arranged as a substantially linear segment, such as segments 44 depicted in FIG. 4 and segment 46 depicted in FIG. 5. In other embodiments, each one of the photoluminescent materials 36a-36c may be arranged as a plurality of substantially linear segments, such as segments 48, 50, and 52 depicted in FIG. 6 and segments 54, 56, and 58 depicted in FIG. 7. Each one of segments 48, 50, and 52 is adjoined at an angle to at least another one of segments 48, 50, and 52. Likewise, each one of segments 54, 56, and 58 is adjoined at an angle to at least another one of segments 54, 56, and 58.

Figure 5:
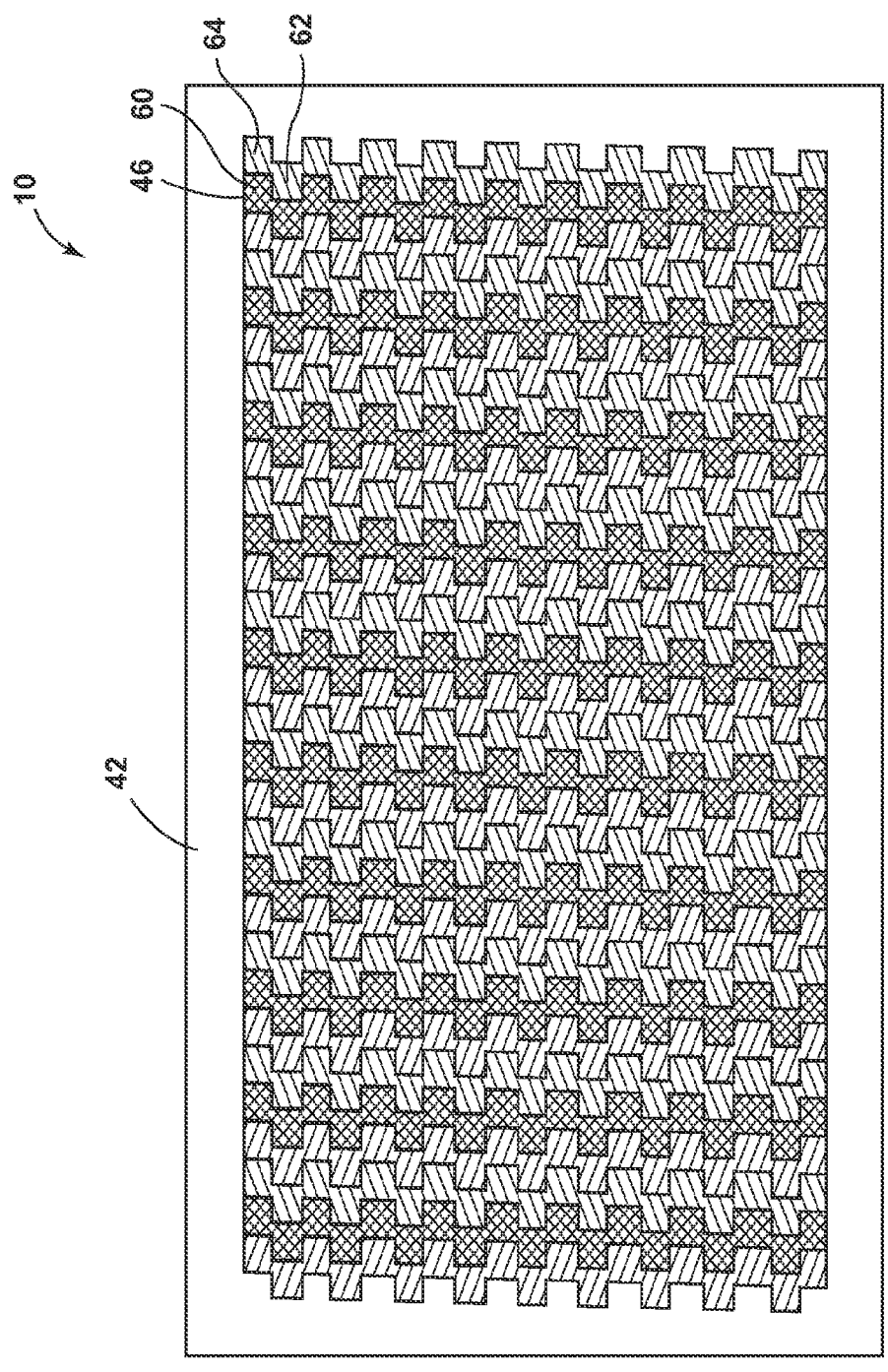
Figure 5:
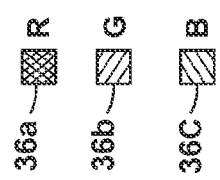
Figure 6:
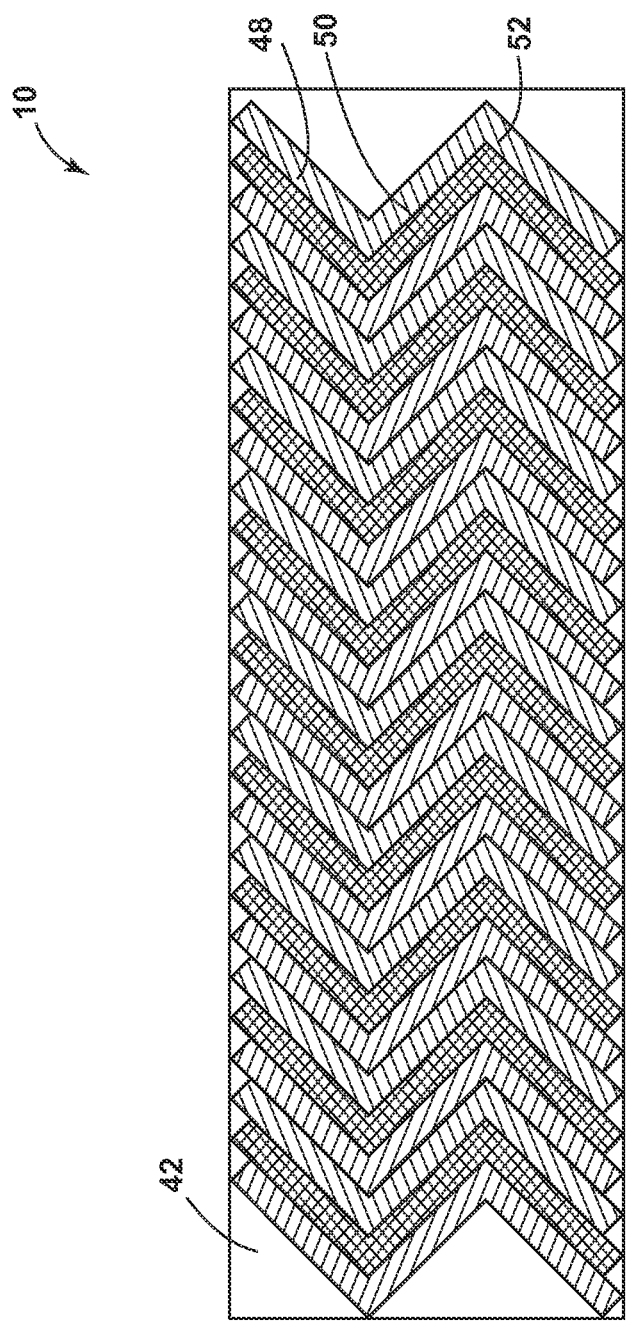
Figure 6:
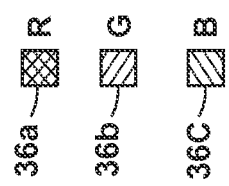
Figure 7:
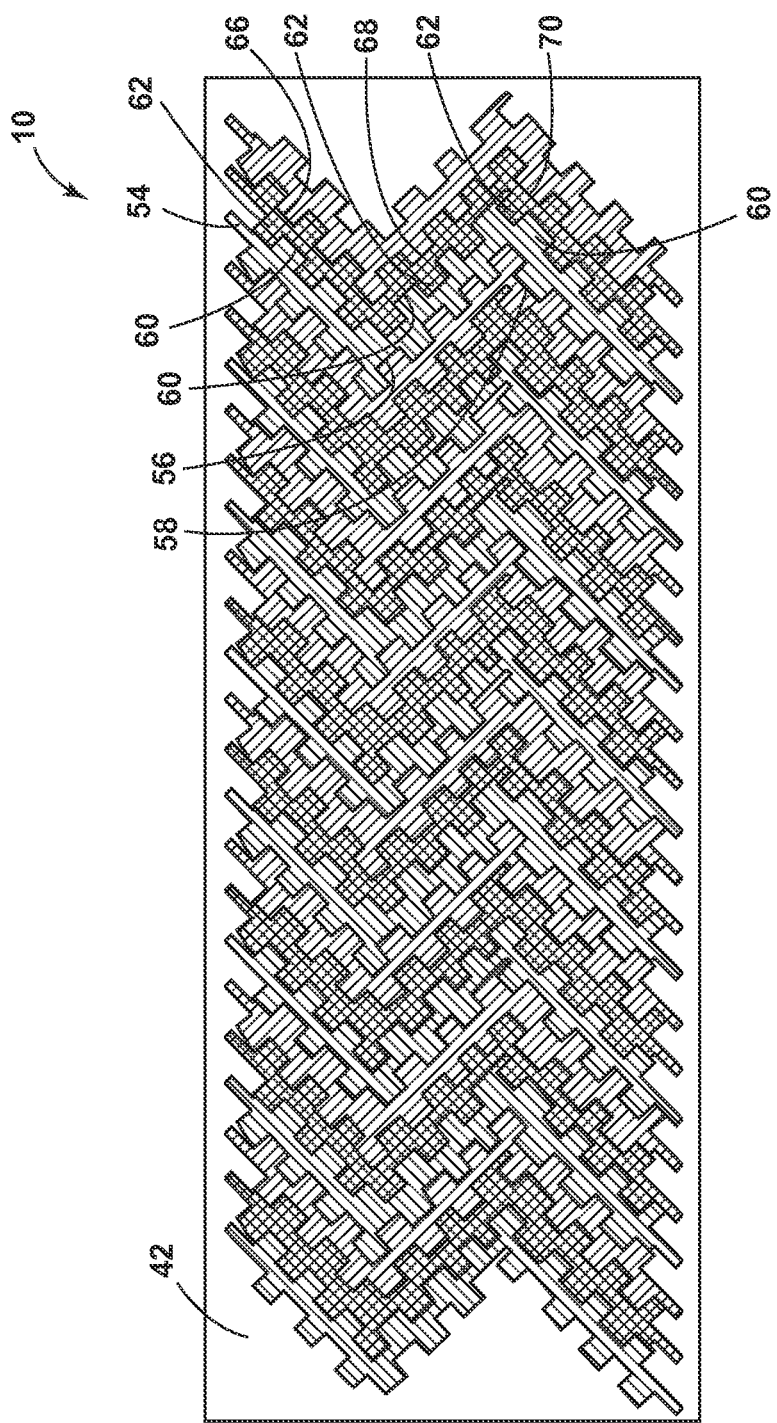
Figure 7:
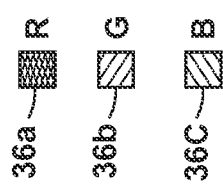

In one embodiment, segment 50 is adjoined to segments 48 and 52, both of which extend orthogonally from segment 48. Segment 56 may be similarly joined to segments 54 and 58. As shown in FIGS. 5 and 7, each one of the photoluminescent materials 36a-36c may be arranged to interlock with at least another one of the plurality of photoluminescent materials 36a-36c. For example, segment 46 depicted in FIG. 5 and segments 54, 56, and 58 depicted in FIG. 7 may each include at least one row of spaced protrusions 60 configured to interlock with a complimentary row of spaced protrusions 62 of a neighboring segment, such as segment 64 depicted in FIG. 5 and segments 66, 68, and 70 depicted in FIG. 7. Generally, tessellations having a greater degree of interlock between the photoluminescent materials will enable improved light distribution across the photoluminescent structure 28 as well as improved light mixing when more than one distinct photoluminescent material is excited. It should be appreciated that each of the photoluminescent materials 36a-36c may be arranged as other shapes having linear and/or non-linear segments. For example, it is contemplated that each of the photoluminescent materials 36a-36c may be arranged in a substantially "S" shape.

In operation, photoluminescent materials 36a may be uniquely excited by a first portion of LED sources, photoluminescent materials 36b may be uniquely excited by a second portion of LED sources, and photoluminescent materials 36c may be uniquely excited by a third portion of LED sources. For purposes of illustration, the first, second, and third portions of LED sources are shown as LED sources 16a, 16b, and 16c in FIG. 8. LED sources 16a, 16b, and 16c may be arranged to alternate in row-wise and/or column-wise and may each be configured as blue, violet, and/or UV LEDs such that the energy conversion process for each of the photoluminescent materials 36a-36c occurs via down conversion. The resultant luminescence may be controlled using the controller 22 to selectively activate the LED sources 16a-16c in any combination. The resultant excitation may be expressed in a variety of colors found in a conventional RGB color scale, assuming the photoluminescent materials 36a-36c correspond to red, green, and blue-emitting photoluminescent materials, respectively. In other embodiments, the LED sources 16a-16c may each be arranged to match the particular shape in which their corresponding photoluminescent materials 36a-36c are arranged. That is, LED sources 16a are arranged substantially below photoluminescent materials 36a, LED sources 16b are arranged substantially below photoluminescent materials 36b, and LED sources 16c are arranged substantially below photoluminescent materials 36c. It should be appreciated that currently employed LED printing processes impart great flexibility in the manner in which numerous LED sources, such as LED sources 16a-16c, are dispersed.

Figure 8:
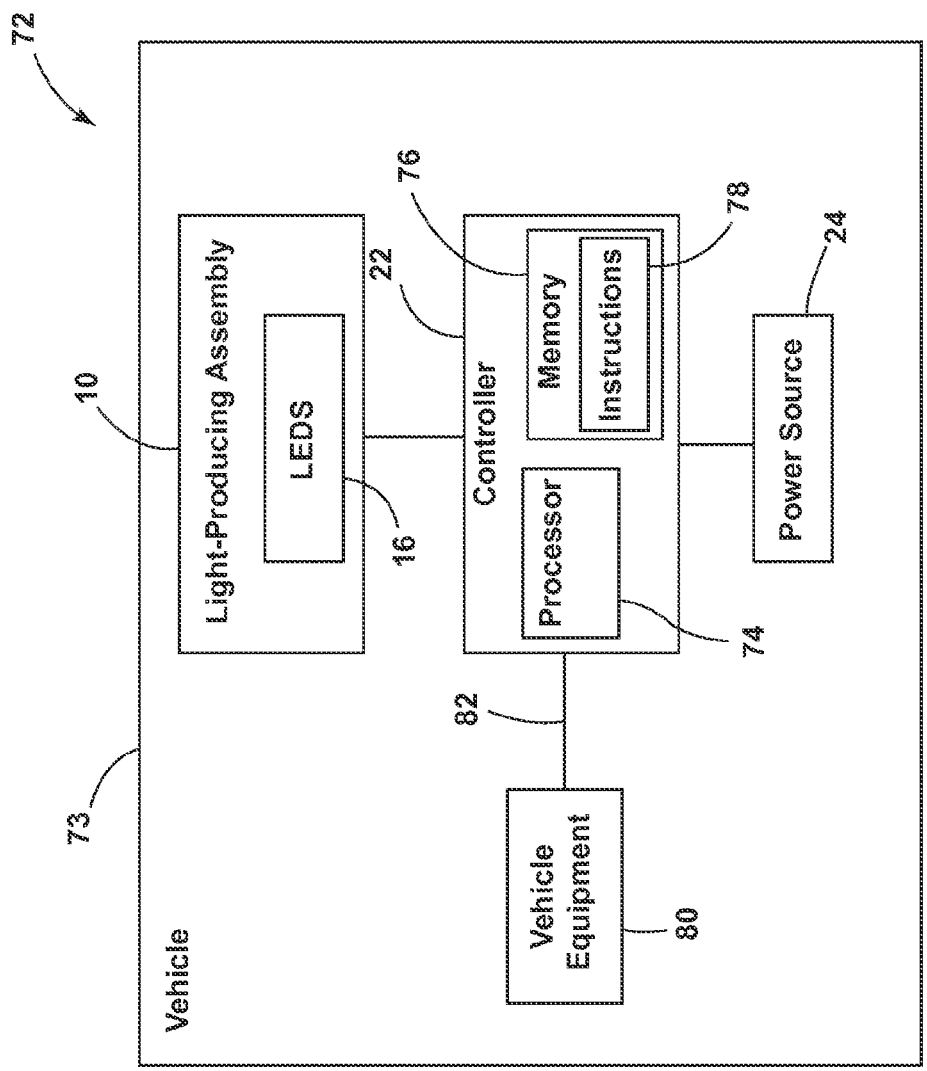
FIG. 8 is a block diagram of a vehicle lighting system employing the light-producing assembly depicted in FIG. 1, according to one embodiment.

Referring to FIG. 8, a block diagram of a lighting system 72 is shown according to one embodiment with continued reference to the light-producing assembly 10 shown in FIG. 1. The light-producing assembly 10 may employ one of the energy conversion processes 38, 40 depicted in FIGS. 2 and 3. That is, the light-producing assembly 10 may be configured to illuminate wholly or in-part in one or more colors. Furthermore, the photoluminescent structure 28 may include one or more photoluminescent materials arranged according to any of the embodiments depicted in FIGS. 4-7. The light-producing assembly 10 is electrically connected to controller 22, which is electrically connected to the power source 24. In one embodiment, the power source 24 may correspond to a vehicular power source operating at 12 to 16 VDC. The controller 22 may be variously located within a vehicle 73 and includes a processor 74 in communication with a memory 76. The memory 76 includes instructions 78 stored thereon that are executable by the processor 74. The instructions 78 relate to controlling an activation state of the light-producing assembly 10 and enable the controller 22 to selectively activate at least a portion of the LED sources 16. The controller 22 may be communicatively coupled to one or more vehicle equipment 80 and use signals received therefrom to control the activation state of the light-producing assembly 10. The controller 22 may communicate with the one or more vehicle equipment 80 over a communication bus 82 of the vehicle 73 and may receive signals directed to a vehicle-related condition such as, but not limited to, an operational state of the vehicle, a status related to a particular vehicle equipment (e.g., door open status), a key fob proximity status, a remote signal sourced from a portable electronic device, a status related to an operating environment of the vehicle (e.g., an ambient light level), or any other information or control signal that may be utilized to activate or otherwise adjust the output of the light-producing assembly 10. It should be appreciated that the controller 22 may be connected to additional light-producing assemblies and configured to selectively activate each light-producing assembly based on one or more vehicle-related conditions.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A light-producing assembly for a vehicle, comprising:
a plurality of light sources;
a photoluminescent structure comprising a plurality of photoluminescent materials arranged to alternate with each other as a repeating shape having a plurality of segments, wherein each segment is adjoined to at least another segment at an angle greater than zero, and wherein the plurality of photoluminescent materials are each configured to luminesce in a distinct color in response to excitation by a corresponding portion of the plurality of light sources.

2. The light-producing assembly of claim 1, wherein the plurality of photoluminescent materials are each configured to down convert an inputted light received from the corresponding portion of the plurality of light sources into a visible light.

3. The light-producing assembly of claim 2, wherein the inputted light comprises one of a blue light, violet light, and a UV light.

4. The light-producing assembly of claim 3, wherein the plurality of light sources comprise printed LEDs.

5. The light-producing assembly of claim 1, wherein the plurality of photoluminescent materials are arranged in a tessellation comprising a single repeated shape.

6. The light-producing assembly of claim 5, wherein each one of the plurality of photoluminescent materials interlocks with at least another one of the plurality of photoluminescent materials.

7. The light-producing assembly of claim 1, wherein the plurality of photoluminescent materials comprises a red-emitting photoluminescent material, a green-emitting photoluminescent material, and a blue-emitting photoluminescent material.

8. A light-producing assembly for a vehicle, comprising:
a plurality of light sources;
a photoluminescent structure arranged over the plurality of light sources and comprising a plurality of photoluminescent materials arranged to alternate in a tessellation comprising a repeating shape having a segment with spaced protrusions, wherein the spaced protrusions of each segment are configured to interlock with the spaced protrusions of a neighboring segment, and wherein each of the plurality of photoluminescent materials is configured to luminesce in a distinct color in response to excitation by a corresponding portion of the plurality of light sources.

9. The light-producing assembly of claim 8, wherein the plurality of photoluminescent materials are each configured to down convert an inputted light received from the corresponding portion of the plurality of light sources into a visible light.

10. The light-producing assembly of claim 9, wherein the inputted light comprises one of a blue light, violet light, and a UV light.

11. The light-producing assembly of claim 10, wherein the plurality of light sources comprise printed LEDs.

12. The light-producing assembly of claim 8, wherein the tessellation comprises a single repeated shape.

13. The light-producing assembly of claim 8, wherein the plurality of photoluminescent materials comprises a red-emitting photoluminescent material, a green-emitting photoluminescent material, and a blue-emitting photoluminescent material.

14. A photoluminescent structure of a light-producing assembly for a vehicle, comprising:
an energy conversion layer having a plurality of photoluminescent materials arranged to alternate in a tessellation comprising a repeating shape having a segment with spaced protrusions, wherein the spaced protrusions of each segment are configured to interlock with the spaced protrusions of a neighboring segment, and wherein each of the plurality of photoluminescent materials is configured to luminesce in a distinct color in response to excitation by a corresponding portion of a plurality of light sources.

15. The photoluminescent structure of claim 14, wherein the plurality of photoluminescent materials are each configured to down convert an inputted light received from a plurality of light sources into a visible light.

16. The photoluminescent structure of claim 15, wherein the inputted light comprises one of a blue light, violet light, and a UV light.

17. The photoluminescent structure of claim 14, wherein the tessellation comprises a single repeated shape.

18. The photoluminescent structure of claim 14, wherein the plurality of photoluminescent materials comprises a red-emitting photoluminescent material, a green-emitting photoluminescent material, and a blue-emitting photoluminescent material.

* * * * *